US011675202B2

(12) United States Patent
Lambert et al.

(10) Patent No.: US 11,675,202 B2
(45) Date of Patent: Jun. 13, 2023

(54) REFLECTIVE OPTICAL ELEMENT, BEAM GUIDING DEVICE AND EUV-BEAM GENERATING DEVICE

(71) Applicant: TRUMPF Lasersystems for Semiconductor Manufacturing GmbH, Ditzingen (DE)

(72) Inventors: Martin Lambert, Korb (DE); Tolga Ergin, Bietigheim-Bissingen (DE)

(73) Assignee: TRUMPF LASERSYSTEMS FOR SEMICONDUCTOR MANUFACTURING GMBH, Ditzingen (DE)

( * ) Notice: Subject to any disclaimer, the term of this patent is extended or adjusted under 35 U.S.C. 154(b) by 469 days.

(21) Appl. No.: 17/076,841

(22) Filed: Oct. 22, 2020

(65) Prior Publication Data

US 2021/0041708 A1    Feb. 11, 2021

Related U.S. Application Data

(63) Continuation of application No. PCT/EP2018/060412, filed on Apr. 24, 2018.

(51) Int. Cl.
*G02B 27/09* (2006.01)
*H05G 2/00* (2006.01)

(52) U.S. Cl.
CPC ..... *G02B 27/0905* (2013.01); *G02B 27/0983* (2013.01); *H05G 2/008* (2013.01)

(58) Field of Classification Search
CPC . G02B 27/0905; G02B 27/0983; H05G 2/008
See application file for complete search history.

(56) References Cited

U.S. PATENT DOCUMENTS

2016/0195729 A1    7/2016   Lambert

FOREIGN PATENT DOCUMENTS

| GB | 2062282 A | 5/1981 |
| WO | WO 2015028103 A1 | 3/2015 |
| WO | WO 2015036025 A1 | 3/2015 |
| WO | WO 2015110238 A1 | 7/2015 |

*Primary Examiner* — Nicole M Ippolito
*Assistant Examiner* — Hanway Chang
(74) *Attorney, Agent, or Firm* — Leydig Voit & Mayer Ltd.

(57) ABSTRACT

A reflective optical element includes a first, inner surface region for reflecting a first inner beam portion of a light beam impinging on the reflective optical element in order to form a first reflected light beam, and at least one second, outer surface region for reflecting at least one second outer beam portion of the impinging light beam for forming at least one second reflected light beam. The second surface region is designed to reduce a beam cross section of the second reflected light beam by comparison to the first reflected light beam such that the second reflected light beam extends along a superposition length completely within the first reflected light beam. In addition a beam guiding device has at least one such reflective optical element and an EUV-beam generating device has such a beam guiding device.

10 Claims, 2 Drawing Sheets

REFLECTIVE OPTICAL ELEMENT, BEAM GUIDING DEVICE AND EUV-BEAM GENERATING DEVICE

CROSS REFERENCE TO RELATED APPLICATIONS

This application is a continuation of International Patent Application No. PCT/EP2018/060412, filed on Apr. 24, 2018. The entire disclosure of both applications is hereby incorporated by reference herein.

FIELD

The present disclosure relates to a reflective optical element, to a beam guiding device having such a reflective optical element, and to an extreme ultraviolet (EUV) radiation generating device having such a beam guiding device.

BACKGROUND

Stops are typically used to delimit the beam cross section or the beam diameter of a light beam, in particular a laser beam, that is incident on a reflective optical element and/or reflected at the reflective optical element. Such stops absorb the power of the light beam that is incident outside the beam cross section specified by the stop aperture. If there is no installation space available for a stop, the intensity of the incident light beam is so high that the stop may possibly be destroyed, or if there are other reasons for not using a stop to delimit the beam cross section, it is necessary to delimit the beam cross section of the light beam in some other way or to select the beam cross section to be so small that it is not incident on components that should not be illuminated. If the beam cross section is not delimited, this can lead to undesirable reflections at these components and/or to undesired heating of these components. The latter can, for example, result in an undesired displacement of the components due to thermal expansion, which can lead to aberrations.

WO 2015/036025 A1 discloses a beam guiding device in which a first laser beam and a second laser beam, which have different wavelengths, are superposed on a common superposition device for common beam guidance in the direction of a target region. The superposition device can be a reflective optical element that has a first surface region for reflecting the first laser beam and a second surface region for reflecting the second laser beam.

SUMMARY

In an embodiment, the present disclosure provides a reflective optical element. The reflective optical element includes a first, inner surface region configured to reflect, so as to form a first reflected light beam, a first, inner radiation component of an incident light beam that is incident on the reflective optical element. The reflective optical element further includes at least one second, outer surface region configured to reflect, so as to form a second reflected light beam, at least one second, outer radiation component of the incident light beam. The second surface region is configured to reduce a beam cross section of the second reflected light beam compared to a beam cross section of the first reflected light beam, so that the second reflected light beam travels along a superposition length completely within the first reflected light beam.

BRIEF DESCRIPTION OF THE DRAWINGS

The subject matter of the present disclosure will be described in even greater detail below based on the exemplary figures. The disclosure is not limited to the exemplary embodiments. All features described and/or illustrated herein can be used alone or combined in different combinations in different embodiments. The features and advantages of various embodiments will become apparent by reading the following detailed description with reference to the attached drawings which illustrate the following.

DETAILED DESCRIPTION

Figure 1:
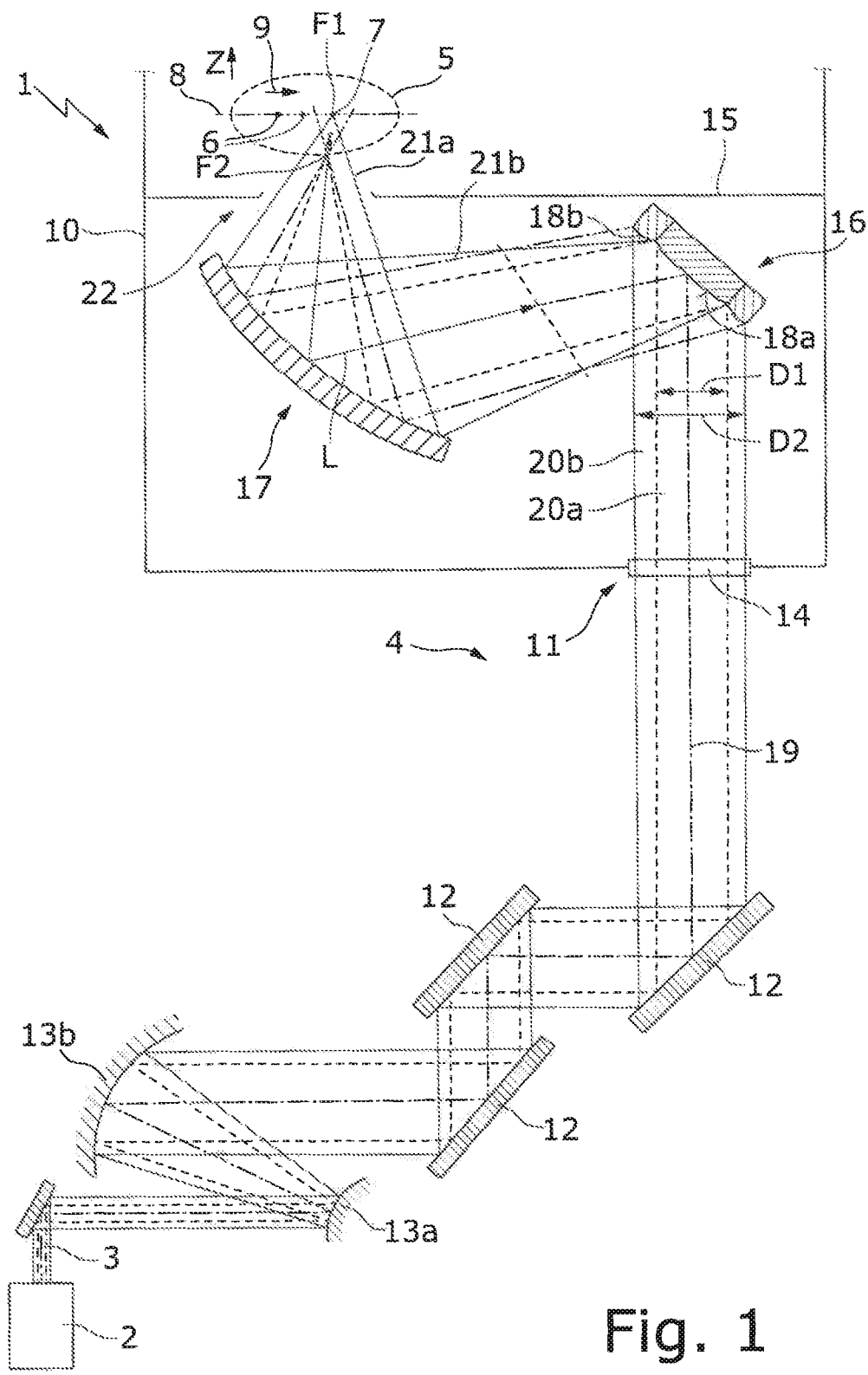
FIG. 1 illustrates an exemplary embodiment of an EUV radiation generating device with a reflective optical element on which a collimated laser beam is incident.

The present disclosure provides a reflective optical element, a beam guiding device having at least one such reflective optical element, and an extreme ultraviolet (EUV) radiation generating device having such a beam guiding device, which delimit the beam cross section or the beam diameter of a light beam, in particular of a laser beam, without the use of a stop.

One aspect of the present disclosure relates to a reflective optical element, comprising: a first, inner surface region for reflecting a first, inner radiation component of a light beam that is incident on the reflective optical element to form a first reflected light beam, and at least one second, outer surface region for reflecting at least one second, outer radiation component of the incident light beam to form at least one second reflected light beam, wherein the second surface region is embodied to reduce a beam cross section of the second reflected light beam relative to the beam cross section of the first reflected light beam, so that the second reflected light beam travels along a superposition length completely within the first reflected light beam.

According to the present disclosure, it is proposed that the beam cross section of the light beam incident on the reflective optical element be delimited by segmenting the reflective surface of the reflective optical element into at least two surface regions. The first, inner or central surface region forms the useful surface for reflecting a first light beam, which forms the useful beam. The at least one second surface region located radially further outwardly serves as a separation surface, that is to say it separates the second radiation component from the first radiation component. The second surface region is additionally embodied, typically in a suitably curved manner, to reduce the beam cross section of the incident second radiation component relative to the beam cross section of the first incident radiation component in a manner such that the second light beam reflected at the second surface region travels into the beam path of the first reflected light beam and travels within a superposition length completely within the first reflected light beam.

In this way, radiation component(s) located radially outwardly with respect to a beam axis of the incident light beam can be prevented from being incident on components, in particular on housing components within the superposition length and from leading to undesired heating there. It is to be understood that components that are arranged in the beam path of the first or second reflected light beam upstream or downstream of the superposition length may possibly also be protected from the radiation components of the incident light beam that are located radially further outwardly. The superposition length here describes that section in the propagation direction of the first light beam in which the second light beam travels completely within the first light beam.

As a rule, the light beam in its intended alignment is incident centrally on the first surface region, that is to say the beam axis of the incident light beam, which can have a round beam cross section, for example, is incident on the center of the first surface region in the intended alignment. The second surface region can surround the first surface region in the shape of a ring, but it is also possible for the reflective optical element to have two or more outer surface regions that form a plurality of ring-shaped regions with respect to the center of the first surface region and/or that are arranged next to one another in the circumferential direction. In any case, the second surface region or regions either have a converging effect on the incident light beam that is greater than the converging effect of the first surface region or a diverging effect that is smaller than the diverging effect of the first surface region.

In one embodiment, the second surface region is curved in a concave, planar or convex manner. For example, the second surface region can be concavely curved, for example form a concavely curved paraboloid, hyperboloid or ellipsoid surface. As a result of the concave curvature, the radiation component of the incident light beam that is incident on the second surface region of the reflective optical element can be transformed from a, for example substantially collimated light beam into a convergent light beam. If the second surface region is a paraboloid surface, the second radiation component that is incident on the reflective optical element in a collimated manner is typically focused at a focus position that ideally lies within the beam cross section of the second reflected light beam. Alternatively, the second surface region can be convexly curved and form, for example, an ellipsoid or paraboloid surface; the second surface region may also be embodied in the form of a planar surface, if appropriate.

In a further embodiment, the second surface region is embodied to focus the second reflected light beam at a focus position that preferably lies within the first reflected light beam. In this case, the second surface region has a curvature that is large enough to focus the second reflected light beam at a focus position that, as a rule, lies within the first reflected light beam. The focus position is usually situated on or near the beam axis of the first reflected light beam. It is to be understood that the location of the focus position can be chosen in such a way that no housing parts or other components that are not suitable for the impingement of the second light beam are situated within the beam path or along the propagation direction of the second light beam, which travels divergently downstream of the focus position.

In a further embodiment, the first surface region is planar or concavely or convexly curved. The first surface region can form, for example, a convexly or concavely curved paraboloid, hyperboloid or ellipsoid surface. The first surface region can be, for example, a planar surface for deflecting the incident light beam, that is to say the reflective optical element forms a deflection mirror, the second, outer surface region of which is used to delimit the beam cross section of the deflected light beam.

A convexly curved first surface region produces a divergent first reflected light beam from the radiation component that is incident in a collimated manner, which simplifies the formation of a superposition length, since in this case it can be sufficient if the second surface region is embodied to be planar or expands the second reflected light beam to a lesser extent than is the case with the first reflected light beam.

If the second reflected laser beam is incident on a reflective optical element, e.g. in the form of a focusing mirror, which follows downstream in the propagation direction of the first light beam, the second light beam that is expanded to a lesser extent is focused by the focusing mirror at a focus position that is typically situated upstream of the focus position of the first light beam.

In a further embodiment, the first surface region and the second surface region merge continuously or discontinuously into one another. The reflective optical element can be embodied in two or more parts, for example, wherein a respective component of the multi-part reflective optical element has at least one of the surface regions. In this way, a discontinuous transition between the surface regions can be implemented in a particularly simple manner. However, it is also possible for the first surface region and the second surface region to merge continuously into one another. In this case, the reflective optical element is preferably formed in one piece, but this is not absolutely necessary.

A further aspect of the present disclosure relates to a beam guiding device for a light beam, in particular for a laser beam, comprising: a component in which an opening is formed, and a reflective optical element that is embodied as described further above, wherein the opening in the component is arranged within the superposition length.

The reflective optical element is in this case typically embodied or adapted to the geometry of the opening in such a way that the first reflected laser beam can pass through the opening without being incident on the component in the process. The second reflected laser beam travels within the first reflected laser beam along the superposition length. This ensures that a light beam that is incident on the reflective optical element and has too large a beam diameter or is possibly decentered due to adjustment errors passes through the opening without grazing it. The component through whose opening the two reflected laser beams pass without grazing the edge of the opening can be, for example, a housing or a housing component, for example in the form of a housing wall, or any other component.

In one embodiment, the beam guiding device comprises a vacuum chamber with a target region in which a target material is able to be introduced to generate EUV radiation, wherein the reflective optical element is embodied to guide the two reflected laser beams in the direction of the target region. In the present embodiment, the beam guiding device forms part of an EUV radiation generating device. A target material, for example in the form of tin droplets, which, when irradiated with the laser beam, transitions into a plasma state and here emits EUV radiation, is provided at the target region.

It has been shown that aberrations can occur in such an EUV radiation generating device if part of the laser power of the laser beam that is incident on the reflective optical element is incident on the surrounding housing or the edge of an opening through which the incident laser beam is guided into the vacuum chamber having the target material. Such aberrations can have an unfavourable effect on the generation of the EUV radiation in the target region, and therefore the laser beam should be prevented from being incident on the housing.

In a development, the beam guiding device comprises a focusing, in particular reflective, optical element for focusing the first reflected laser beam at a first focus position within the target region and for focusing the second reflected laser beam at a second focus position upstream or downstream of the target region.

In this case, the reflective optical element can be embodied, for example, in the form of a beam-expanding optical element. In this case, the second reflected laser beam can for example be incident divergently on the focusing optical element that is embodied to be reflective, for example in the form of an ellipsoid mirror, and is focused, due to the smaller divergence angle compared to the first reflected laser beam, at a second focus position, which lies in the propagation direction upstream of the target region with the first focus position. It is to be understood, however, that the reverse case is also possible, that is, that the second reflected laser beam is focused at a focus position downstream of the target region.

A further aspect of the present disclosure relates to an EUV radiation generating device, comprising: a beam source for generating a laser beam and a beam guiding device embodied as described above. The beam guiding device is preferably embodied to radiate the laser beam in a collimated manner onto the reflective optical element. The beam source can be, for example, a laser source, for example one or more $CO_2$ lasers, which generate one or possibly more pulsed laser beams (a sequence of laser pulses). The pulsed laser beam is typically amplified by a plurality of optical amplifiers of an amplifier arrangement of a driver laser arrangement with the result that it is incident on the reflective optical element with considerable power.

In the following description of the drawings, identical reference signs are used for the same components or for components having the same function.

FIG. 1 shows an EUV radiation generating device 1 with a beam source 2 in the form of a driver laser, embodied in the form of a $CO_2$ laser, which generates a pulsed laser beam 3 with a high radiant power (»1 kW). To generate the laser beam 3 with a high beam power, the beam source 2 can comprise a plurality of amplifiers. The laser beam 3 generated by the $CO_2$ laser has a wavelength of approximately 10.6 μm in the example shown.

The EUV radiation generating device 1 further comprises a beam guiding device 4 by means of which the laser beam 3 is guided in the direction of a target region 5 on which a target material 6 is incorporated in the form of tin droplets in order to generate EUV radiation 7. The illustration of measurement devices for monitoring the beam path of the laser beam 3 has been omitted for reasons of clarity. The target material 6, that is to say the tin droplets, is/are produced by means of a supply device (not shown) and it moves along a predetermined movement path 8 or a predetermined path that corresponds to a substantially horizontal, straight movement path in the manner of a trajectory of a projectile, along a horizontal movement direction 9. It is to be understood that the movement direction 9 can also correspond to another direction, for example the direction of gravity.

For generating the EUV radiation 7, the target material 6 is initially influenced, that is to say heated, expanded, vaporized, ionized, and/or brought into the state of a weak or possibly a strong plasma in a pre-pulse (not shown) that is generated by the radiation source 2 or by a further radiation source. By means of the laser beam 3, which forms a main pulse having a higher power, the main part of the target material 6 influenced by the pre-pulse is converted into the plasma state, and the EUV radiation 7 is generated in the process.

For the targeted alignment or focusing of the EUV radiation 7 generated in this way, the EUV radiation generating device 1 comprises an EUV focusing mirror (not shown). The target material 6, the EUV focusing mirror, and the target region 5, in which the target material 6 is able to be introduced, are arranged in a vacuum chamber 10 of the beam guiding device 4, whereas the beam source 2 is arranged outside the vacuum chamber 10.

In order to guide the laser beam 3 in the direction of the target region 5, the laser beam 3 is guided starting from the beam source 2 via an opening 11 into the vacuum chamber 10. In order to guide the laser beam 3 from the beam source 2 to the opening 11, the beam guiding device 4 has a plurality of deflecting mirrors 12 and a pair of parabolic mirrors 13a,b, wherein the latter serve to change the beam cross section of the laser beam 3. In addition or as an alternative to the use of parabolic mirrors 13a,b, ellipsoidal or hyperboloidal mirrors can also serve to change the beam cross section of the laser beam 3.

The opening 11 in the vacuum chamber 10 is closed in a gas-tight manner by way of a plate-shaped optical element 14 in the form of a window. The target region 5 of the vacuum chamber 10 is separated by a housing component 15 in the form of an intermediate wall from a focusing unit that is arranged in the vacuum chamber 10 and has a reflective optical element 16 in the form of a beam-expanding mirror and a further reflective optical element 17 in the form of an ellipsoidal mirror.

In the example shown, the reflective optical element 16 is embodied in the form of a faceted mirror, that is to say it has a first, inner surface region 18a and a second, outer surface region 18b that annularly surrounds the first, circular surface region 18a. The reflective optical element 16 or the two surface regions 18a,b serve as a geometric beam splitter: A radiation component 20a that is located radially inwardly with respect to a beam axis 19 of the incident laser beam 3 and is incident on the first surface region 18a is reflected at the first surface region 18a in the form of a first laser beam 21a. Correspondingly, a (ring-shaped) second radiation component 20b, that lies radially outwardly with respect to the beam axis 19 of the laser beam 3 and is incident on the second surface region 18b is reflected at the second surface region 18b and forms a second reflected laser beam 21b.

The second surface region 18b is embodied to reduce a beam cross section D2 of the second reflected laser beam 20b in relation to the beam cross section D1 of the first reflected laser beam 20a, with the result that the second reflected laser beam 20b travels completely within the first reflected laser beam 21a along a superposition length L, which extends along the beam axis 19 of the first reflected laser beam 21a. The second beam cross section D2 (or beam diameter) of the second radiation component 20b, which is larger on the reflective optical element 16, is thus reduced compared to the first beam cross section D1 of the first radiation component 21a, which is smaller on the reflective optical element 16, with the result that the second reflected laser beam 21b travels within the first reflected laser beam 21a after a short propagation length.

An opening 22 formed in the intermediate wall 15 is located within the superposition length L of the two reflected laser beams 21a,b. The second reflected laser beam 21b, more precisely its beam cross section D2, in the region of the opening 22 thus lies completely within the beam cross section D1 of the first reflected laser beam 21a. In this way, it can be prevented that the second, radially outer radiation component 20b of the laser beam 3 incident on the reflective optical element 16 is incident on the edge of the opening 22 and heats the housing component 15 in the form of the intermediate wall, which can lead to aberrations when generating the EUV radiation 7.

Regardless of whether the incident laser beam 3 is incident on the reflective optical element 16, owing to a misalignment, with a lateral offset and/or incorrectly aligned, or whether it has an excessively large beam cross section, the beam cross section D1 of the reflected first laser beam 21a remains unchanged so that it can pass through the opening 22 without grazing the edge of the opening 22.

In the example shown in FIG. 1, the first, inner surface region 18a of the reflective optical element 16 is embodied in the form of a convex paraboloid surface that expands the first reflected laser beam 21a. The further reflective optical element 17 is embodied in the form of an ellipsoid mirror, which focuses the first reflected laser beam 21a onto a first focus position F1 in the target region 5. The second, outer surface region 18b, which discontinuously adjoins the first surface region 18a in the example shown, is (less) convexly curved in order to form a second reflected laser beam 21b having a smaller divergence than the first, inner surface region 18a. The second reflected laser beam 21b is focused by the ellipsoid mirror 17 onto a second focus position F2 located on the beam axis 19 of the first reflected laser beam 21a upstream of the target region 5. It is to be understood that the second focus position F2 does not necessarily have to be located on the beam axis 19 of the first reflected laser beam 21a but can alternatively be located near the beam axis 19 of the first reflected laser beam 21a, that is to say the beam axes of the two reflected laser beams 21a,b need not necessarily coincide, which is different from what is shown in FIG. 1.

The second reflected laser beam 21b travels divergently downstream of the second focus position F2 and no longer travels within the first reflected laser beam 21a downstream of the end of the superposition length L. The second reflected laser beam 21b is expanded here to such an extent that it no longer has any influence on the generation of the EUV radiation 7 in the target region 5.

No components that have a negative influence on the generation of the EUV radiation 7 when the second reflected laser beam 21b is incident and reflected or when it is heated are arranged in the beam path of the second reflected laser beam 21b downstream of the target region 5. As an alternative to focusing the second reflected laser beam 21b at a focus position F2 upstream of the target region 5, the second reflected laser beam 21b can also be focused at a focus position F2 downstream of the target region 5, for example if the second laser beam 21b is focused at an intermediate focus with the aid of the second surface region 18b before it is incident on the further reflective optical element 17.

Figure 2:
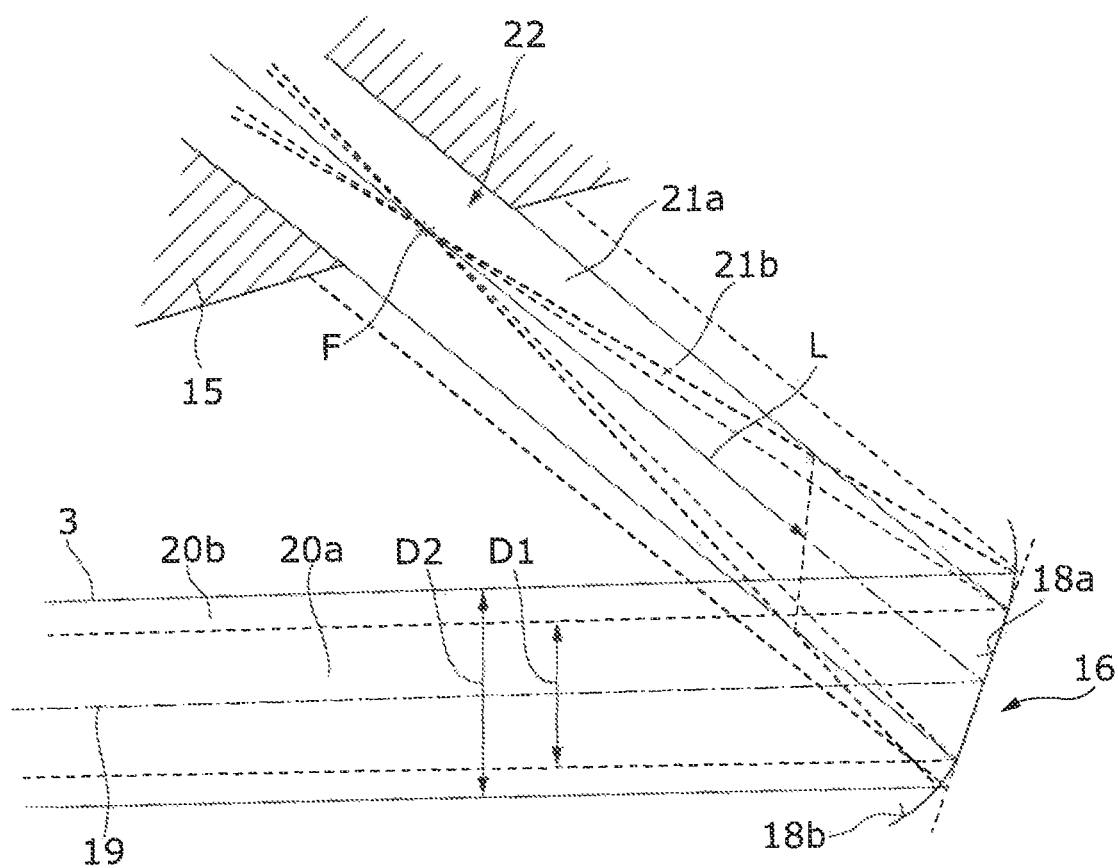
FIG. 2 provides an illustration of a housing component in which an opening is formed, through which a first and a second light beam reflected at a reflective optical element pass.

FIG. 2 shows a reflective optical element 16, which, like the reflective optical element 16 shown in FIG. 1, has a first and second surface region 18a,b to split a radially inner and outer radiation component 20a, 20b of an incident light beam 3 into two reflected light beams 21a, 21b, which together pass through an opening 22 in a housing component 15. The reflective optical element 16 of FIG. 2 is a deflecting mirror deflecting the light beam 3 that is incident in a collimated manner in the direction of the opening 22 in the housing component 15.

As in the example shown in FIG. 1, the first reflected light beam 21a forms the useful beam, while the second reflected light beam 21b serves to reduce the beam diameter D2 of the radially outer radiation component 20b of the incident light beam 3 compared to the beam diameter D1 of the first reflected light beam 21a, with the result that the second reflected light beam 21b travels completely within the first light beam 21a within the superposition length L. The opening 22 in the housing component 15 is located, as in FIG. 1, within the superposition length L, of which only a portion, extending from an end of the superposition length L facing the reflective optical element 16 into the opening 22, is shown in FIG. 2.

In the example shown in FIG. 2, the second, outer surface region 18b continuously adjoins the first, inner surface region 18a. The second, outer surface region 18b is embodied in the form of a concavely curved paraboloid surface that focuses the second, ring-shaped light beam 21b at a focus position F that, as in the example shown in FIG. 1, lies on the beam axis 19 of the first reflected light beam 21a. In this way, the second reflected light beam 21b in the region of the opening 22 travels within the first reflected light beam 21a and thus is not incident on the housing component 15, as would be the case if the reflective optical element 16 were embodied entirely in the form of a plane mirror, such as is indicated by way of dashed lines in FIG. 2.

The reflective element 16 can also be used to prevent the incident light beam 3 from being incident on the housing component 15 in the example shown in FIG. 2. It is to be understood that the reflective optical element 16 shown in FIG. 2 can be arranged in the EUV radiation generating device 1 shown in FIG. 1, but also in other optical arrangements, in order to prevent a light beam 3, in particular a laser beam, from unintentionally—for example owing to an incorrect adjustment—being incident on components arranged near the beam path of the light beam 3 to be reflected.

While the subject matter of the disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A reflective optical element, comprising:
   a first, inner surface region configured to reflect, so as to form a first reflected light beam, a first, inner radiation component of an incident light beam that is incident on the reflective optical element, and
   at least one second, outer surface region configured to reflect, so as to form a second reflected light beam, at least one second, outer radiation component of the incident light beam,
   wherein the second surface region is configured to reduce a beam cross section of the second reflected light beam compared to a beam cross section of the first reflected light beam, so that the second reflected light beam travels along a superposition length completely within the first reflected light beam.

2. The reflective optical element as claimed in claim 1, wherein the second surface region is concave, planar, or convexly curved.

3. The reflective optical element as claimed in claim 1, wherein the second surface region is configured to focus the second reflected light beam at a focus position that lies within the first reflected light beam.

4. The reflective optical element as claimed in claim 1, wherein the first surface region is concave, planar, or convexly curved.

5. The reflective optical element as claimed in claim 1, wherein the first surface region and the second surface region merge continuously or discontinuously into one another.

6. A beam guiding device for a light beam, comprising:
a component in which an opening is formed, and
at least one reflective optical element as claimed in claim 1,
wherein the opening in the component is located within the superposition length.

7. The beam guiding device as claimed in claim 6, further comprising:
a vacuum chamber with a target region into which a target material is configured to be introduced for generating EUV radiation,
wherein the reflective optical element is configured to guide the two reflected laser beams in a direction of the target region.

8. The beam guiding device as claimed in claim 7, further comprising:
a focusing optical element configured to focus the first reflected laser beam at a first focus position within the target region and configured to focus the second reflected laser beam at a second focus position upstream or downstream of the target region.

9. An EUV radiation generating device, comprising:
a beam source configured to generate a laser beam; and
a beam guiding device as claimed in claim 6.

10. The EUV radiation generating device as claimed in claim 9,
wherein the beam guiding device is configured to radiate the laser beam onto the reflective optical element in a collimated manner.

* * * * *